(12) United States Patent
Kokumai et al.

(10) Patent No.: US 8,864,381 B2
(45) Date of Patent: Oct. 21, 2014

(54) FLUID DYNAMIC BEARING DEVICE

(75) Inventors: Hiromichi Kokumai, Kuwana (JP);
Kazuyoshi Harada, Kuwana (JP); Isao Komori, Kuwana (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/976,816

(22) PCT Filed: Jan. 6, 2012

(86) PCT No.: PCT/JP2012/050205
§ 371 (c)(1),
(2), (4) Date: Jun. 27, 2013

(87) PCT Pub. No.: WO2012/105280
PCT Pub. Date: Aug. 9, 2012

(65) Prior Publication Data
US 2013/0272634 A1    Oct. 17, 2013

(30) Foreign Application Priority Data
Jan. 31, 2011 (JP) ................................. 2011-018357

(51) Int. Cl.
*F16C 32/06* (2006.01)
*F16C 17/02* (2006.01)
*F16C 33/10* (2006.01)

(52) U.S. Cl.
CPC .............. *F16C 32/06* (2013.01); *F16C 17/026* (2013.01); *F16C 33/107* (2013.01)
USPC ........................................................ 384/114

(58) Field of Classification Search
CPC ..... F16C 17/026; F16C 32/06; F16C 32/0659
USPC .................................. 384/107, 114
See application file for complete search history.

(56) References Cited

U.S. PATENT DOCUMENTS

| 5,129,739 A | 7/1992 | Asai et al. |
| 7,556,433 B2 * | 7/2009 | Kurimura et al. ............. 384/107 |

(Continued)

FOREIGN PATENT DOCUMENTS

| JP | 03-69813 A | 3/1991 |
| JP | 04-19421 A | 1/1992 |

(Continued)

OTHER PUBLICATIONS

International Search Report for PCT/JP2012/050205, Mailing Date of Jan. 31, 2012.

(Continued)

*Primary Examiner* — Phillip A Johnson
(74) *Attorney, Agent, or Firm* — Westerman, Hattori, Daniels & Adrian, LLP

(57) ABSTRACT

A fluid dynamic bearing device (1), comprising a dynamic pressure generating groove region (B) being provided on an inner peripheral surface (3a) of a bearing member (3), which forms a radial bearing gap, the region (B) comprising: a first region (B1) for generating a fluid dynamic pressure when the bearing member (3) and a shaft member (2) are rotated relative to each other in a forward direction; and a second region (B2) for generating a fluid dynamic pressure when the bearing member (3) and the shaft member (2) are rotated relative to each other in a reverse direction. A portion of the region (B), corresponds to an end portion on an open-to-air side of the radial bearing gap, comprises an annular projecting portion (6) provided closer to the shaft member (2) with respect to a groove bottom of each of the plurality of dynamic pressure generating grooves (4).

8 Claims, 3 Drawing Sheets

(56) References Cited

U.S. PATENT DOCUMENTS

| | | |
|---|---|---|
| 2006/0222276 A1 | 10/2006 | Uenosono |
| 2008/0309183 A1* | 12/2008 | Murakami et al. ............ 310/90 |
| 2009/0148084 A1* | 6/2009 | Komori et al. ............... 384/107 |

FOREIGN PATENT DOCUMENTS

| | | | |
|---|---|---|---|
| JP | 09-264318 A | | 10/1997 |
| JP | 2000154822 A | * | 6/2000 |
| JP | 2000-232753 A | | 8/2000 |
| JP | 2001-200845 A | | 7/2001 |
| JP | 2002-286027 A | | 10/2002 |
| JP | 2005-351374 A | | 12/2005 |
| JP | 2005351376 A | * | 12/2005 |
| JP | 2005351377 A | * | 12/2005 |
| JP | 2006-283773 A | | 10/2006 |
| JP | 2008-261397 A | | 10/2008 |

OTHER PUBLICATIONS

Notification of Transmittal of Translation of the International Preliminary Report on Patentability (Form PCT/IB/338) of International Application No. PCT/JP2012/050205 mailed Aug. 15, 2013 with Forms PCT/IB/373 and PCT/ISA/237.

* cited by examiner

FLUID DYNAMIC BEARING DEVICE

TECHNICAL FIELD

The present invention relates to a fluid dynamic bearing device.

BACKGROUND ART

The fluid dynamic bearing device refers to a bearing device for supporting a shaft member and a bearing member in freely relatively rotatable and non-contact manners in a radial direction by using a fluid pressure generated through a dynamic pressure action of dynamic pressure generating grooves in a radial bearing gap between the bearing member and the shaft member inserted along an inner periphery of the bearing member. Such a fluid dynamic bearing device is capable of supporting, with high accuracy and quietness, the shaft member relatively rotated at high speed, and hence is suitably used as a bearing for small motors to be mounted to information apparatus, such as a spindle motor for disk drives for HDDs, CD-ROMs, DVD-ROMs, and the like, a polygon scanner motor for laser beam printers, and a fan motor for PCs.

In the small motors to be mounted to the above-mentioned information apparatus, it suffices that the shaft member that is relatively rotated in one direction (forward direction) can be supported. In recent years, there has been studied use of the fluid dynamic bearing device for supporting a shaft member that is relatively rotated in both directions (forward direction and reverse direction) in, for example, servo-motors to be incorporated into machinery equipment or the like and motors to be incorporated into electrical devices of automobiles. However, in a case where the bearing device to be used for supporting the shaft member that is relatively rotated in one direction is used as it is for supporting the shaft member that is relatively rotated in both the directions, when the shaft member is relatively rotated in the reverse direction, a negative pressure may be generated in a part of a region in the radial bearing gap, or an oil film to be formed in the radial bearing gap may be interrupted. Thus, it is difficult to support the shaft member in a desired non-contact manner.

As a countermeasure, as described, for example, in Patent Literature 1 below, there has been proposed a fluid dynamic bearing device in which dynamic pressure generating groove regions (each including a plurality of dynamic pressure generating grooves inclined with respect to an axial direction and arrayed in a circumferential direction) respectively for a forward rotation and a reverse rotation are molded on an inner peripheral surface of a bearing member that forms radial bearing gaps with respect to an outer peripheral surface of a shaft member. With this, the shaft member can be supported in a desired non-contact manner irrespective of whether the shaft member is relatively rotated in the forward direction or the reverse direction.

CITATION LIST

Patent Literature 1: JP 2005-351374 A

SUMMARY OF INVENTION

Technical Problem

The bearing member described in Patent Literature 1 has advantages of excellent mass-productivity and capability of stably supporting, in a non-contact manner, the shaft member that is relatively rotated in both the forward and reverse directions. However, there is still room for improvement.

Specifically, in the case where the inner peripheral surface of the bearing member is provided with the dynamic pressure generating groove regions each including the plurality of dynamic pressure generating grooves arrayed in the circumferential direction, when the bearing member and the shaft member are rotated relative to each other, a fluid such as a lubricating oil interposed in the radial bearing gap is flowed along the dynamic pressure generating grooves. Thus, depending on a formation pattern of the dynamic pressure generating groove region (array pattern of the dynamic pressure generating grooves), when the bearing member and the shaft member are rotated relative to each other, the lubricating oil interposed in the radial bearing gap is flowed to an open-to-air side of the bearing member. When such a phenomenon occurs particularly in a fluid dynamic bearing device of a type in which the radial bearing gap is not always filled with an ample amount of the lubricating oil, an amount of the lubricating oil to be interposed in the radial bearing gap is deficient. As a result, supportability is liable to be less stable.

It is therefore an object of the present invention to provide a fluid dynamic bearing device comprising a dynamic pressure generating groove region in which a shaft member that is relatively rotated in both forward and reverse directions can be supported in a non-contact manner in a radial direction, and being capable of stably maintaining desired bearing performance irrespective of a formation pattern of the dynamic pressure generating groove region.

Solution to Problem

A fluid dynamic bearing device according to the present invention devised to solve the above-mentioned object comprises: a bearing member; a shaft member that is inserted along an inner periphery of the bearing member and forms a radial bearing gap with respect to an inner peripheral surface of the bearing member; and a dynamic pressure generating groove region having a plurality of dynamic pressure generating grooves inclined with respect to an axial direction and arrayed in a circumferential direction, the dynamic pressure generating groove region being provided on the inner peripheral surface of the bearing member or an outer peripheral surface of the shaft member, which forms the radial bearing gap, the dynamic pressure generating groove region comprising: a first region for generating a fluid dynamic pressure in the radial bearing gap when the bearing member and the shaft member are rotated relative to each other in a forward direction; and a second region for generating a fluid dynamic pressure in the radial bearing gap when the bearing member and the shaft member are rotated relative to each other in a reverse direction, wherein the dynamic pressure generating groove region comprises an annular projecting portion at a portion corresponding to an end portion on an open-to-air side of the radial bearing gap, the annular projecting portion being provided to be closer to a counterpart member with respect to a groove bottom of each of the plurality of dynamic pressure generating grooves. Note that, the "counterpart member" in the present invention refers to the shaft member in a case where the dynamic pressure generating groove region is provided on the inner peripheral surface of the bearing member, and to the bearing member in a case where the dynamic pressure generating groove region is provided on the outer peripheral surface of the shaft member.

As described above, at the portion of the dynamic pressure generating groove region, which corresponds to the end portion on the open-to-air side of the radial bearing gap, the annular projecting portion is provided to be closer to the counterpart member with respect to the groove bottom of each of the plurality of dynamic pressure generating grooves. With this, when the bearing member and the shaft member inserted along the inner periphery thereof are rotated relative to each other in the forward direction or the reverse direction, flows of a fluid, which are generated in the radial bearing gap, can be blocked at a downstream end of the radial bearing gap. As a result, leakage of the fluid to an outside of the radial bearing gap, and by extension, to an outside of the fluid dynamic bearing device can be prevented as much as possible. In this way, the radial bearing gap can be filled with a predetermined amount of the fluid, and desired bearing performance can be stably maintained. Note that, the annular projecting portion may be continuous with hill portions defining the plurality of dynamic pressure generating grooves, or may be discontinuous with the hill portions (provided separately from the dynamic pressure generating groove region in the axial direction).

In the configuration described above, the dynamic pressure generating groove region may comprise two dynamic pressure generating groove regions provided separately at two positions in the axial direction. In this case, in each of the two dynamic pressure generating groove regions, the annular projecting portion (annular projecting portion closer to the counterpart member with respect to the groove bottom of each of the plurality of dynamic pressure generating grooves) may be further provided along an end portion on a side closer to the dynamic pressure generating groove region on a counterpart side. With such a configuration, a flow of the fluid from the radial bearing gap between the dynamic pressure generating groove region on one side in the axial direction and the counterpart member toward the radial bearing gap between the dynamic pressure generating groove region on another side in the axial direction and the counterpart member can be suppressed. Thus, a pressure (fluid pressure) generated in each of the radial bearing gaps can be sufficiently increased, and supportability in the radial direction can be enhanced.

When the two dynamic pressure generating groove regions are provided separately at the two positions in the axial direction, in each of the two dynamic pressure generating groove regions, the plurality of dynamic pressure generating grooves may be inclined in the same direction at a portion closest to the dynamic pressure generating groove region on a counterpart side. This configuration is applicable irrespective of whether or not the annular projecting portion is provided in each of the two dynamic pressure generating groove regions along the end portion on the side closer to the dynamic pressure generating groove region on the counterpart side. When this configuration is applied to the case where the annular projecting portion is not provided in each of the two dynamic pressure generating groove regions along the end portion on the side closer to the dynamic pressure generating groove region on the counterpart side, between the two radial bearing gaps formed respectively in the two dynamic pressure generating groove regions, the fluid can be flowed forcibly to one side in the axial direction irrespective of whether the bearing member and the shaft member are rotated relative to each other in the forward direction or the reverse direction. With this, the fluid can be flowed and circulated more efficiently between the two radial bearing gaps. As a result, the fluid can be prevented as much as possible from being deteriorated earlier, and by extension, the bearing performance can be further stabilized.

When the two dynamic pressure generating groove regions are provided separately at the two positions in the axial direction, a gap width between the outer peripheral surface of the shaft member and the inner peripheral surface of the bearing member at a position between the two dynamic pressure generating groove regions is set to be larger than a gap width between the counterpart member and each of the two dynamic pressure generating groove regions (gap width of the radial bearing gap). With this, a rotational torque in the radial direction can be prevented as much as possible from unnecessarily increasing, and hence electric power consumption of a motor incorporating the fluid dynamic bearing device can be saved.

The present invention is suitably applicable to a fluid dynamic bearing device comprising a bearing member opened at both axial ends to the air, in other words, a cylindrical bearing member. As a matter of course, the present invention is applicable also to a fluid dynamic bearing device of a type in which one axial end of the bearing member is opened to the air.

In the configuration described above, the bearing member or the shaft member, which comprises the dynamic pressure generating groove region, is desirably made of a sintered metal. This is because the sintered metal is excellent in processability, and hence the dynamic pressure generating groove region can be formed into a complicated shape easily and with high accuracy. Further, irrespective of whether the bearing member or the shaft member, which comprises the dynamic pressure generating groove region, is made of the sintered metal or materials other than the sintered metal, the plurality of dynamic pressure generating grooves (dynamic pressure generating groove region) can be formed by any one of a pressing process of pressing against a preform a die corresponding to a predetermined shape of the plurality of dynamic pressure generating grooves and an array pattern of the plurality of dynamic pressure generating grooves, a rolling process of moving a rolling tool and the preform relative to each other so as to form the plurality of dynamic pressure generating grooves into the predetermined shape, and a laser process for applying a laser to the preform. By those processing methods, the plurality of dynamic pressure generating grooves (dynamic pressure generating groove region) can be formed into a complicated shape efficiently and with high accuracy.

The fluid dynamic bearing device described above according to the present invention can be suitably incorporated into motors that are rotated in both the forward and reverse directions, such as a servo-motor for machinery equipment and a motor for electrical devices of automobiles. As a matter of course, the fluid dynamic bearing device is applicable also to small motors to be mounted to information apparatus. In this case, it is unnecessary to take directionality at the time of assembly into consideration, and hence the motor can be easily assembled.

Advantageous Effects of Invention

As described above, according to the present invention, it is possible to provide the fluid dynamic bearing device comprising the dynamic pressure generating groove region in which the shaft member that is relatively rotated in both forward and reverse directions can be supported in a non-contact manner in the radial direction, and being capable of stably maintaining desired bearing performance irrespective of a formation pattern of the dynamic pressure generating groove region in which the plurality of inclined dynamic pressure generating grooves are arrayed in the circumferential direction.

DESCRIPTION OF EMBODIMENTS

Figure 1:
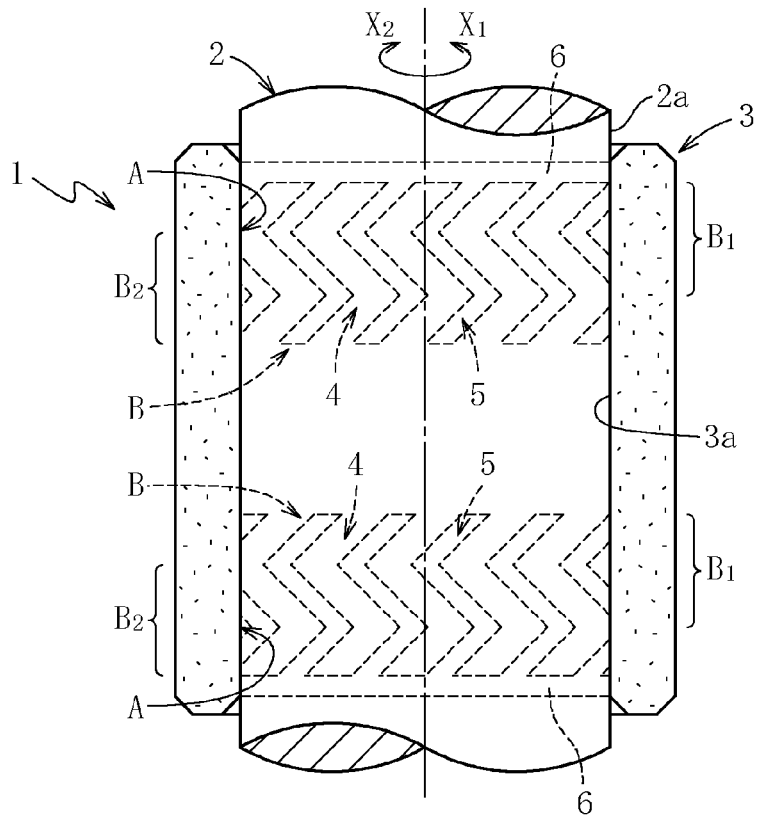
FIG. 1 A schematic sectional view of a fluid dynamic bearing device according to an embodiment of the present invention.

In the following, description is made of embodiments of the present invention with reference to the drawings. Note that, in the following description, for the sake of directional simplicity, an upper side in the drawings and a lower side in the drawings are respectively referred to as an "upper side" and a "lower side."

FIG. 1 is a schematic sectional view of a fluid dynamic bearing device 1 according to one embodiment of the present invention. The fluid dynamic bearing device 1 comprises a bearing member 3 and a shaft member 2 that is inserted along an inner periphery of the bearing member 3 and rotated in a forward direction or a reverse direction relative to the bearing member 3. The shaft member 2 is made of a metal material such as stainless steel, and has an outer peripheral surface 2a that is formed into an even and smooth cylindrical surface shape and faces an inner peripheral surface 3a of the bearing member 3. Lubricating oil is interposed as a fluid in a gap (radial gap) between the inner peripheral surface 3a of the bearing member 3 and the outer peripheral surface 2a of the shaft member 2. Note that, in the fluid dynamic bearing device 1 according to this embodiment, the bearing member 3 serves as a static side, and the shaft member 2 serves as a rotary side.

Figure 2:
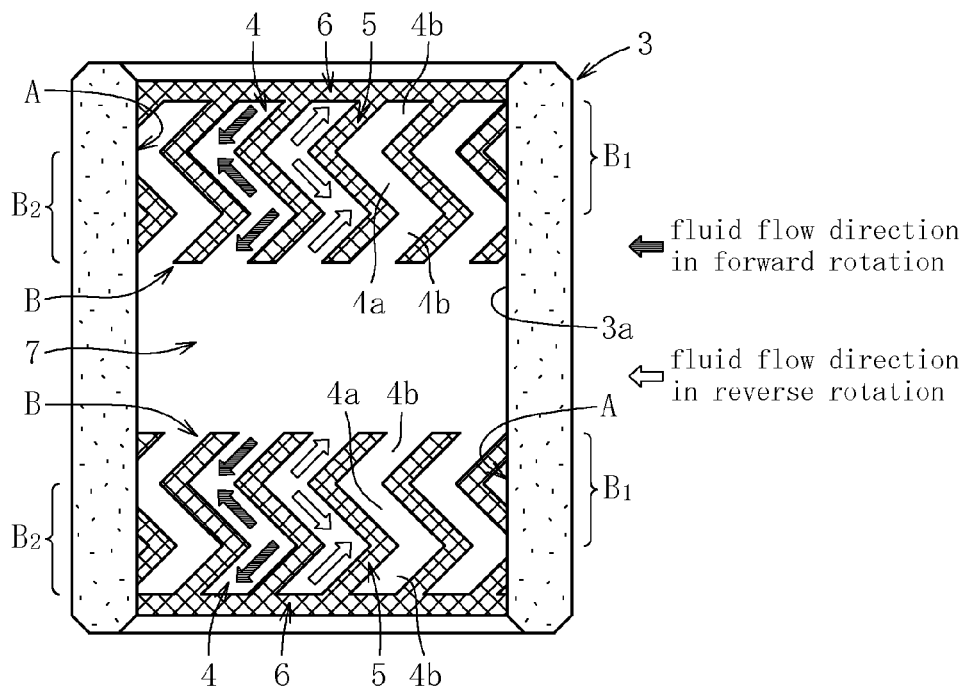
FIG. 2 A sectional view of a bearing member in FIG. 1.

The bearing member 3 is obtained by forming a sintered metal containing copper and iron as main components into a cylindrical shape opened at both axial ends to the air. Also as illustrated in FIG. 2, the inner peripheral surface 3a of the bearing member 3 comprises cylindrical radial bearing surfaces A and A that are provided separately at two positions in the axial direction and form radial bearing gaps with respect to the opposed outer peripheral surface 2a of the shaft member 2. The radial bearing surfaces A each comprise a dynamic pressure generating groove region B comprising a plurality of dynamic pressure generating grooves 4 arrayed along an entire circumferential direction. The dynamic pressure generating grooves 4 of the dynamic pressure generating groove region B each comprise a combination of a first groove portion 4a and second groove portions 4b inclined in directions different from each other with respect to the axial direction. Here, the dynamic pressure generating grooves 4 are each formed by providing the second groove portions 4b continuously to both sides in the axial direction of the first groove portion 4a (linking the second groove portions 4b respectively to an upper end and a lower end of the first groove portion 4a). In this embodiment, the first groove portions 4a and both the second groove portions 4b and 4b are set to have uniform groove depths and axial lengths, respectively.

The dynamic pressure generating groove regions B and B configured as described above each comprise a first region B1 for generating a fluid dynamic pressure in the radial bearing gap when the shaft member 2 is rotated in the forward direction (direction of an arrow X1 in FIG. 1) and a second region B2 for generating a fluid dynamic pressure in the radial bearing gap when the shaft member 2 is rotated in the reverse direction (direction of an arrow X2 in FIG. 1). In this embodiment, in each of the upper and lower dynamic pressure generating groove regions B and B, the first region B1 comprises a chain of the first groove portion 4a and the second groove portion 4b provided continuously with the upper side thereof, and the second region B2 comprises a chain of the first groove portion 4a and the second groove portion 4b provided continuously with the lower side thereof. In other words, when the shaft member 2 is rotated in the forward direction, in the dynamic pressure generating groove region B, a joining portion of the first groove portion 4a and the upper second groove portion 4b of each of the dynamic pressure generating grooves 4 serves as a pressure generating portion (refer to the solid arrow illustrated in FIG. 2). Meanwhile, when the shaft member 2 is rotated in the reverse direction, in the dynamic pressure generating groove region B, a joining portion of the first groove portion 4a and the lower second groove portion 4b of each of the dynamic pressure generating grooves 4 serves as a pressure generating portion (refer to the hollow arrow illustrated in FIG. 2).

At a portion of the upper dynamic pressure generating groove region B, which corresponds to an end portion (upper end portion) on the open-to-air side of the radial bearing gap, an annular projecting portion 6 is formed to project to an inner diameter side with respect to a groove bottom of each of the dynamic pressure generating grooves 4 so as to be closer to the shaft member 2. Similarly, at a portion of the lower dynamic pressure generating groove region B, which corresponds to an end portion (lower end portion) on the open-to-air side of the radial bearing gap, an annular projecting portion 6 is formed to project to the inner diameter side with respect to the groove bottom of each of the dynamic pressure generating grooves 4 so as to be closer to the shaft member 2. The upper annular projecting portion 6 is continuous with upper ends of hill portions 5 defining the dynamic pressure generating grooves 4 of the upper dynamic pressure generating groove region B, and the lower annular projecting portion 6 is continuous with lower ends of the hill portions 5 defining the dynamic pressure generating grooves 4 of the lower dynamic pressure generating groove region B. The annular projecting portions 6 are each set to have a height equal to or slightly smaller than that of the hill portions 5.

A region between the two dynamic pressure generating groove regions B and B on the inner peripheral surface 3a of the bearing member 3 is formed into the even and smooth cylindrical surface shape, and this cylindrical surface portion 7 is flush with the groove bottom of each of the dynamic pressure generating grooves 4. Note that, an inner diameter dimension of the cylindrical surface portion 7 of the bearing member 3 is set so that a gap width of a radial gap that is formed between the cylindrical surface portion 7 and the outer peripheral surface 2a of the shaft member 2 is larger than a gap width of each of the radial gaps (radial bearing gaps) that are formed between the dynamic pressure generating groove regions B of the bearing member 3 and the outer peripheral surface 2a of the shaft member 2. Thus, the cylindrical surface portion 7 only needs to be formed at a diameter larger than that of the hill portions 5 defining the dynamic pressure generating grooves 4, and need not necessarily be formed flush with the groove bottom of each of the dynamic pressure generating grooves 4.

Figure 3:
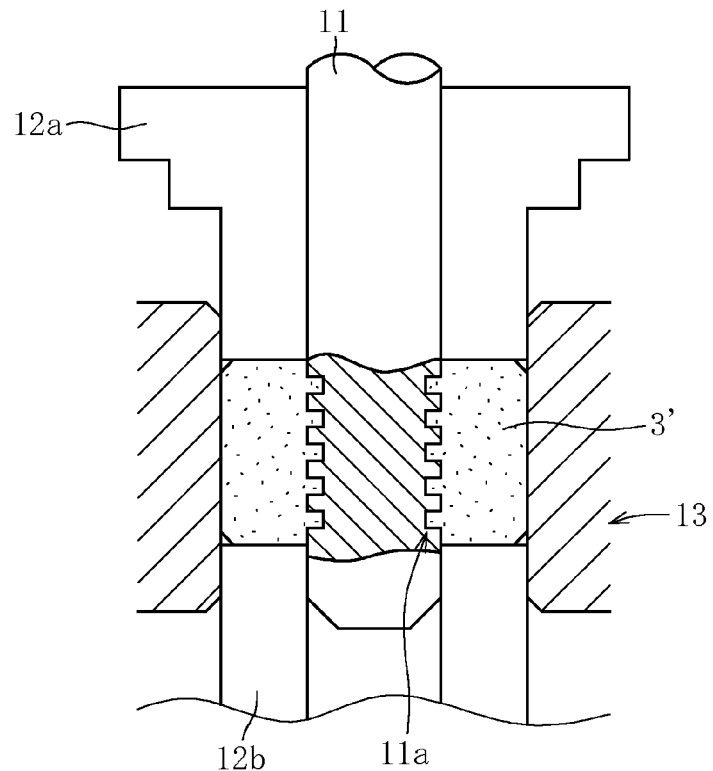
FIG. 3 A schematic view illustrating a step of molding a dynamic pressure generating groove region.

The dynamic pressure generating groove regions B and B described above can be formed, for example, through a pressing process. In this embodiment, the entire inner peripheral surface 3a of the bearing member 3 is formed through the pressing process. As illustrated in FIG. 3, in the pressing process, a core rod 11 having a projection-recess die 11a provided on an outer peripheral surface thereof in conformity with the shape of the inner peripheral surface 3a of the bearing member 3 is inserted along an inner periphery of a bearing preform 3' having inner and outer peripheral surfaces each formed into an even and smooth cylindrical surface. Then, both axial end surfaces of the bearing preform 3' are held with punches 12a and 12b, and the bearing preform 3' in this state is pushed into a die 13. When the bearing preform 3' is pushed into the die 13, a compressive force is applied from the punches 12a and 12b and the die 13 to the bearing preform 3', and the inner peripheral surface of the bearing preform 3' is pressed against the projection-recess die 11a of the core rod 11. With this, the inner peripheral surface of the bearing preform 3' undergoes plastic deformation in conformity with the projection-recess die 11a of the core rod 11. In this way, the dynamic pressure generating groove regions B and B (plurality of dynamic pressure generating grooves 4, and hill portions 5 defining the dynamic pressure generating grooves 4), the annular projecting portions 6, and the cylindrical surface portion 7 between the two dynamic pressure generating groove regions B and B are molded to the inner peripheral surface 3a.

Note that, when the bearing preform 3' (bearing member 3) is taken out from the die 13 after the molding of the inner peripheral surface 3a is completed, spring-back of the bearing member 3 causes the inner peripheral surface thereof to increase in diameter. Thus, the projection-recess die 11a and the dynamic pressure generating groove regions B after the molding do not interfere with each other, and the core rod 11 can be smoothly withdrawn from the inner periphery of the bearing member 3. After the core rod 11 is withdrawn, inner pores of the bearing member 3 are impregnated with the lubricating oil as a fluid by known oil impregnation methods such as vacuum impregnation.

When the inner peripheral surface 3a is formed through the pressing process so as to comprise the dynamic pressure generating groove regions B and B in this way, variation in shape accuracy of the inner peripheral surface 3a (dynamic pressure generating groove regions B, annular projecting portions 6, and cylindrical surface portion 7) among bearing members 3 as products can be prevented as much as possible. As a result, the inner peripheral surface 3a of high accuracy can be obtained. Note that, at least the dynamic pressure generating groove regions B and B of the inner peripheral surface 3a may be formed through a rolling process, or a laser process. The same applies to other embodiments described below.

In the fluid dynamic bearing device 1 configured as described above, when the shaft member 2 is rotated in the forward direction (direction of the arrow X1 in FIG. 1), the radial bearing gaps are formed between the outer peripheral surface 2a of the shaft member 2 and each of the radial bearing surfaces A and A provided oppositely thereto and separately at the two upper and lower positions on the inner peripheral surface 3a of the bearing member 3. Then, along with the rotation of the shaft member 2, pressure of the lubricating oil interposed in both the radial bearing gaps is increased in the first region B1 of each of the dynamic pressure generating groove regions B. As a result, the shaft member 2 is held in a non-contact manner in a radial direction. Meanwhile, when the shaft member 2 is rotated in the reverse direction (direction of the arrow X2 in FIG. 1), the radial bearing gaps are formed between the outer peripheral surface 2a of the shaft member 2 and each of the radial bearing surfaces A and A provided oppositely thereto and separately at the two upper and lower positions on the inner peripheral surface 3a of the bearing member 3. Then, along with the rotation of the shaft member 2, the pressure of the lubricating oil interposed in both the radial bearing gaps is increased in the second region B2 of each of the dynamic pressure generating groove regions B. As a result, the shaft member 2 is held in a non-contact manner in the radial direction.

As described above, irrespective of whether the shaft member 2 is rotated in the forward direction or the reverse direction, the pressure of the lubricating oil interposed in the radial bearing gaps can be increased in the dynamic pressure generating groove regions B provided separately at the two upper and lower positions on the inner peripheral surface 3a of the bearing member 3. When the shaft member 2 is rotated, the lubricating oil interposed in the radial bearing gaps is flowed along the dynamic pressure generating grooves 4. Thus, without any countermeasure, when the shaft member 2 is rotated in the forward direction, the lubricating oil interposed between the outer peripheral surface 2a of the shaft member 2 and the inner peripheral surface 3a of the bearing member 3 is liable to leak from a lower opening portion of the bearing member 3 to an outside. Similarly, when the shaft member 2 is rotated in the reverse direction, the lubricating oil interposed between the outer peripheral surface 2a of the shaft member 2 and the inner peripheral surface 3a of the bearing member 3 is liable to leak from an upper opening portion of the bearing member 3 to the outside.

In contrast, in the present invention, at the portion of each of the dynamic pressure generating groove regions B, which corresponds to the end portion on the open-to-air side of the radial bearing gap (in this embodiment in which the dynamic pressure generating groove regions B are provided separately at the two positions in the axial direction, an upper end portion of the upper dynamic pressure generating groove region B and a lower end portion of the lower dynamic pressure generating groove region B), the annular projecting portion 6 is provided to project to the inner diameter side with respect to the groove bottom of each of the dynamic pressure generating grooves 4 so as to be closer to the shaft member 2 (counterpart member). With this, irrespective of whether the bearing member 3 and the shaft member 2 inserted along the inner periphery thereof are rotated relative to each other in the forward direction or the reverse direction, flows of the lubricating oil, which are generated in the radial bearing gaps (radial gaps formed between the shaft member 2 and the bearing member 3), can be blocked at a downstream end of each of the radial bearing gaps. As a result, leakage of the lubricating oil to the outside can be prevented as much as possible. In this way, the radial bearing gaps can be filled with a predetermined amount of the lubricating oil, and desired bearing performance can be stably maintained.

In this embodiment, in each of the upper and lower dynamic pressure generating groove regions B and B provided to the inner peripheral surface 3a of the bearing member 3, the dynamic pressure generating grooves 4 are inclined in the same direction at a portion closest to the dynamic pressure generating groove region on a counterpart side. In this case, a lower end of each of the dynamic pressure generating grooves 4 of the upper dynamic pressure generating groove region B and an upper end of each of the dynamic pressure generating grooves 4 of the lower dynamic pressure generating groove region B each correspond to the second groove portion 4b. Further, the smooth cylindrical surface portion 7 flush with the groove bottom of each of the dynamic pressure generating grooves 4 is provided between the upper and lower dynamic pressure generating groove regions B and B. With this, between the radial bearing gap formed in the upper dynamic pressure generating groove region B and the radial bearing gap formed in the lower dynamic pressure generating groove region B, the lubricating oil can be flowed forcibly to one side in the axial direction irrespective of whether the shaft member 2 is rotated in the forward direction or the reverse direction. The pressure tends to decrease on an upstream side of this flow, and hence, the lubricating oil seeps from an inside of the bearing member 3 made of a sintered metal into the radial bearing gaps through surface pores. Meanwhile, the pressure tends to increase on a downstream side of the flow, and hence the lubricating oil interposed in the radial bearing gaps flows back into the bearing member 3 through the surface pores. As a result, a circulation cycle of the lubricating oil can be formed between the inside of the bearing member 3 and each of the two radial bearing gaps. With this, the lubricating oil can be flowed and circulated more efficiently between the two radial bearing gaps. In this way, the bearing performance can be stabilized, and the lubricating oil can be prevented from being deteriorated earlier due to a shearing action and a thermal effect in the radial bearing gaps.

With regard to the above description of the fluid dynamic bearing device 1 according to one embodiment of the present invention, various modifications may be made to the fluid dynamic bearing device 1 according to the present invention. In the following description of a modification of the bearing member 3 of the fluid dynamic bearing device 1 with reference to the drawings, only differences from the above-mentioned fluid dynamic bearing device 1 are specifically described, and substantially the same components are denoted by the same reference symbols to omit redundant description.

Figure 4:
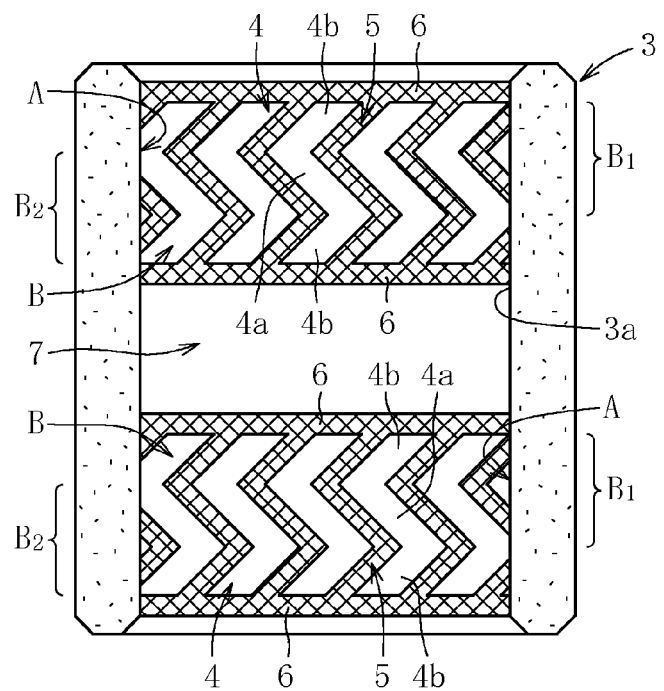
FIG. 4 A sectional view of a bearing member according to another embodiment of the present invention.

In an example of the bearing member 3 illustrated in FIG. 4, the annular projecting portion 6 is formed in a pattern different from that of the bearing member 3 described above. Specifically, the annular projecting portion 6 is provided along each axial end of each of the upper and lower dynamic pressure generating groove regions B. In other words, in each of the dynamic pressure generating groove regions B and B provided separately at two upper and lower positions, an annular projecting portion 6 is further provided along an end portion on a side closer to the dynamic pressure generating groove region B on the counterpart side (lower end portion of the upper dynamic pressure generating groove region B and upper end portion of the lower dynamic pressure generating groove region B) so as to project to the inner diameter side with respect to the groove bottom of each of the dynamic pressure generating grooves 4 and to be closer to the outer peripheral surface 2a of the shaft member 2. With such a configuration, in comparison with the embodiment described above, a flow (flow amount) of the lubricating oil from the radial bearing gap on one side in the axial direction toward the radial bearing gap on another side in the axial direction can be suppressed. Thus, the pressure generated in each of the radial bearing gaps can be sufficiently increased, and supportability in the radial direction can be enhanced.

Note that, with the configuration illustrated in FIG. 4, in which the annular projecting portion 6 is provided along each of the axial ends of each of the dynamic pressure generating groove regions B, a flow-out amount of the lubricating oil to an outside of the radial bearing gaps can be reduced. Thus, the configuration is particularly suitable to the fluid dynamic bearing device 1 of a type in which a total amount of the lubricating oil interposed in the device is small.

Figure 5:
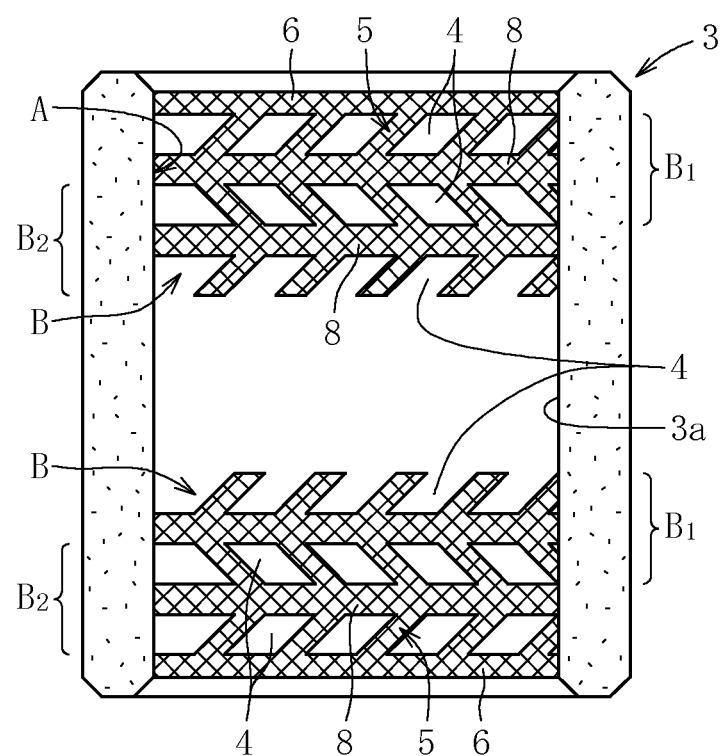
FIG. 5 A sectional view of a bearing member according to still another embodiment of the present invention.

The bearing member 3 illustrated in FIG. 5 is different in configuration from that illustrated in FIG. 2 in that, in each of the dynamic pressure generating groove regions B, (annular) back portions 8 extending along the entire circumference of the inner peripheral surface 3a are provided to pass across each of the joining portions of the first groove portion 4a and the upper second groove portion 4b and the joining portions of the first groove portion 4a and the lower second groove portion 4b of the dynamic pressure generating grooves 4. The back portions 8 are each formed to have substantially the same height as that of the hill portions 5 defining the dynamic pressure generating grooves 4. In the example illustrated in FIG. 5, in each of the dynamic pressure generating groove regions B and B provided separately at two upper and lower positions, the annular projecting portion 6 is provided only along the end portion on the open-to-air side. However, as in the embodiment illustrated in FIG. 4, the annular projecting portion 6 may be provided along each of the axial ends of each of the upper and lower dynamic pressure generating groove regions B.

The above-mentioned array pattern of the dynamic pressure generating grooves 4 (formation pattern of the dynamic pressure generating groove region B) is merely a typical example. In other words, irrespective of whether the shaft member 2 is relatively rotated in the forward direction or the reverse direction, the array pattern of the dynamic pressure generating grooves 4 inclined with respect to the axial direction may be arbitrarily set as long as a dynamic pressure action of the lubricating oil can be generated in the radial bearing gaps formed between the radial bearing surfaces A (dynamic pressure generating groove regions B) and the opposed outer peripheral surface 2a of the shaft member 2.

Further, in the case described above, the present invention is applied to the fluid dynamic bearing device 1 in which the dynamic pressure generating groove regions B are provided separately at the two upper and lower positions on the inner peripheral surface 3a of the bearing member 3. However, the present invention is preferably applicable also to the fluid dynamic bearing device 1 in which the dynamic pressure generating groove region B is provided only at one position in the axial direction on the inner peripheral surface 3a of the bearing member 3. In this case, along each axial end of the dynamic pressure generating groove region B, the annular projecting portion 6 is formed to project to the inner diameter side with respect to the groove bottom of each of the dynamic pressure generating grooves 4 so as to be closer to the counterpart member (shaft member 2).

Further, in the case described above, the present invention is applied to the fluid dynamic bearing device 1 comprising the bearing member 3 made of a sintered metal. However, the present invention is preferably applicable also to a case where the bearing member 3 is made of materials other than the sintered metal, for example, solid metal materials such as brass, or resin materials (regardless of porous or non-porous). Alternatively, the present invention is preferably applicable also to the fluid dynamic bearing device 1 in which only one of the axial ends of the bearing member 3 is opened to the air (bearing member 3 is formed into a bottomed cylindrical shape)

Still alternatively, the present invention is preferably applicable also to the fluid dynamic bearing device 1 in which the dynamic pressure generating groove region B is provided not on the inner peripheral surface 3a of the bearing member 3 but on the outer peripheral surface 2a of the shaft member 2. In this case, the shaft member 2 may be made of a sintered metal, or may be made of solid metal materials (such as stainless steel).

The fluid dynamic bearing device 1 described above is capable of not only supporting relative rotations in both the forward and reverse directions, but also preventing as much as possible leakage of the lubricating oil to the outside. Thus, although not shown, the fluid dynamic bearing device 1 is suitable to motors that are rotated in both the forward and reverse directions and are required to stably support the rotations in both of those directions over a long period of time, such as a servo-motor for machinery equipment and a motor for electrical devices of automobiles. As a matter of course, the fluid dynamic bearing device 1 described above is applicable also to small motors to be mounted to information apparatus typified by an HDD. In this case, it is unnecessary to take directionality at the time of assembly into consideration, and hence the motor can be easily assembled.

REFERENCE SIGNS LIST

1 fluid dynamic bearing device
2 shaft member
3 bearing member
3a inner peripheral surface
4 dynamic pressure generating groove
4a first groove portion
4b second groove portion
5 hill portion
6 annular projecting portion
7 cylindrical surface portion
A radial bearing surface
B dynamic pressure generating groove region
B1 first region
B2 second region

The invention claimed is:

1. A fluid dynamic bearing device, comprising:
a bearing member;
a shaft member that is inserted along an inner periphery of the bearing member and forms a radial bearing gap with respect to an inner peripheral surface of the bearing member; and
a dynamic pressure generating groove region having a plurality of dynamic pressure generating grooves inclined with respect to an axial direction and arrayed in a circumferential direction,
the dynamic pressure generating groove region being provided on the inner peripheral surface of the bearing member or an outer peripheral surface of the shaft member, which forms the radial bearing gap,
the dynamic pressure generating groove region comprising:
a first region for generating a fluid dynamic pressure in the radial bearing gap when the bearing member and the shaft member are rotated relative to each other in a forward direction; and
a second region for generating a fluid dynamic pressure in the radial bearing gap when the bearing member and the shaft member are rotated relative to each other in a reverse direction,
wherein the dynamic pressure generating groove region comprises an annular projecting portion provided to be closer to a counterpart member with respect to a groove bottom of each of the plurality of dynamic pressure generating grooves,
wherein the dynamic pressure generating groove region comprises a dynamic pressure generating groove which is nearest to an open-to-air side of the radial bearing gap, among all dynamic pressure generating grooves in the dynamic pressure generating groove region, and
wherein the annular projecting portion is closer to the open-to-air side of the radial bearing gap than the dynamic pressure generating groove which is nearest to the open-to-air side of the radial bearing gap.

2. A fluid dynamic bearing device according to claim 1,
wherein the dynamic pressure generating groove region comprises two dynamic pressure generating groove regions provided separately at two positions in the axial direction, and
wherein, in each of the two dynamic pressure generating groove regions, the annular projecting portion is further provided along an end portion on a side closer to the dynamic pressure generating groove region on a counterpart side.

3. A fluid dynamic bearing device according to claim 2, wherein a gap width between the outer peripheral surface of the shaft member and the inner peripheral surface of the bearing member at a position between the two dynamic pressure generating groove regions is set to be larger than a gap width between the counterpart member and each of the two dynamic pressure generating groove regions.

4. A fluid dynamic bearing device according to claim 1,
wherein the dynamic pressure generating groove region comprises two dynamic pressure generating groove regions provided separately at two positions in the axial direction, and
wherein, in each of the two dynamic pressure generating groove regions, the plurality of dynamic pressure generating grooves are inclined in the same direction at a portion closest to the dynamic pressure generating groove region on a counterpart side.

5. A fluid dynamic bearing device according to claim 4, wherein a gap width between the outer peripheral surface of the shaft member and the inner peripheral surface of the bearing member at a position between the two dynamic pressure generating groove regions is set to be larger than a gap width between the counterpart member and each of the two dynamic pressure generating groove regions.

6. A fluid dynamic bearing device according to claim 1, wherein the bearing member comprises both axial ends opened to an air.

7. A fluid dynamic bearing device according to claim 1, wherein the bearing member or the shaft member, which comprises the dynamic pressure generating groove region, is made of a sintered metal.

8. A fluid dynamic bearing device according to claim 1, wherein the plurality of dynamic pressure generating grooves are formed by any one of a pressing process, a rolling process, and a laser process.

* * * * *